June 25, 1968    J. A. WILSON    3,390,015
METHOD AND APPARATUS FOR AUTOMATICALLY CONTROLLING FUEL CELL
Filed May 26, 1964    2 Sheets-Sheet 1
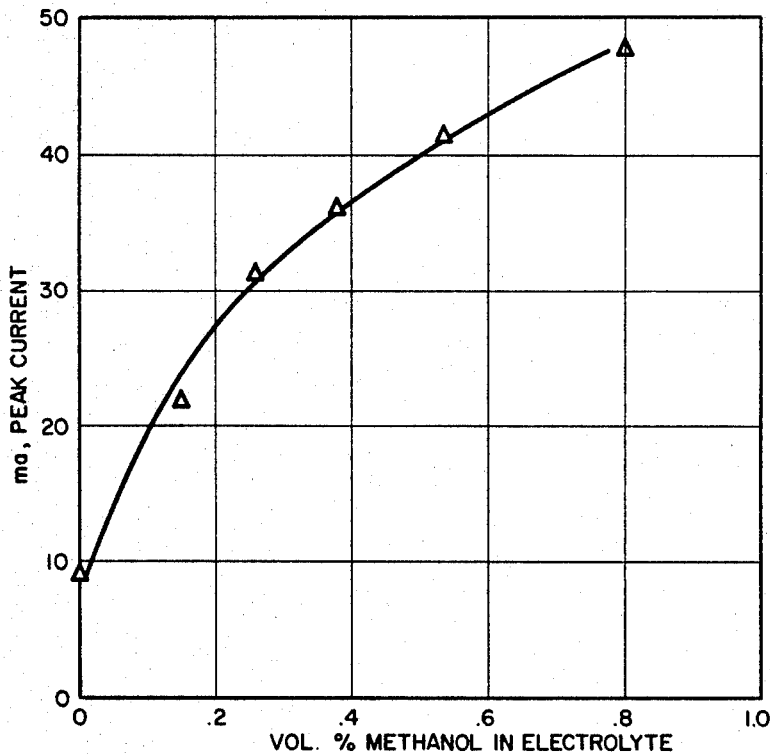
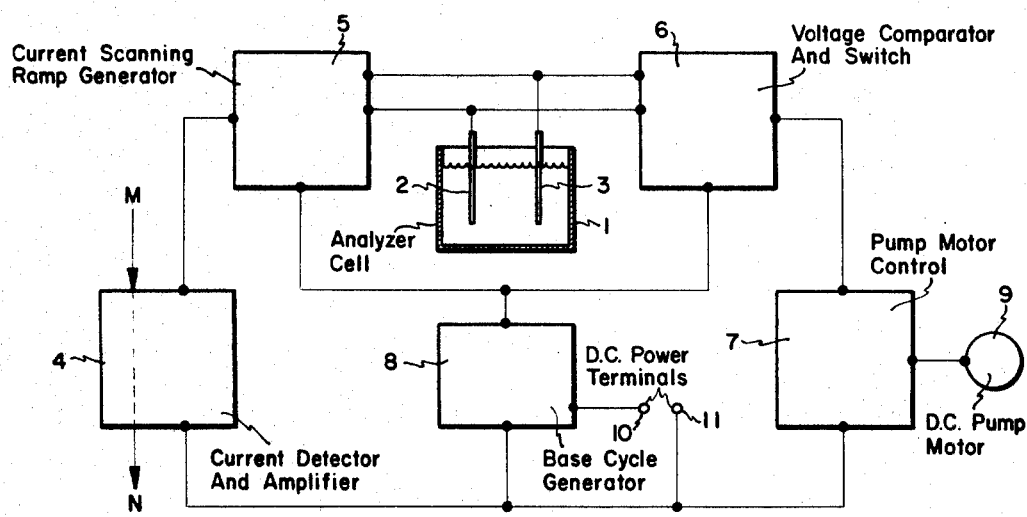
JAMES A. WILSON    INVENTOR
BY *Henry Berk*
PATENT ATTORNEY

JAMES A. WILSON INVENTOR

3,390,015
METHOD AND APPARATUS FOR AUTOMATICALLY CONTROLLING FUEL CELL
James A. Wilson, Stanhope, N.J., assignor to Esso Research and Engineering Company, a corporation of Delaware
Filed May 26, 1964, Ser. No. 370,292
4 Claims. (Cl. 136—86)

ABSTRACT OF THE DISCLOSURE

The fuel feed to a fuel cell utilizing a liquid fuel may be controlled by a system which measures the current in the fuel cell, such current being a variable of the amount of liquid feed, and increasing or decreasing this feed such that the cell operates at its optimum efficiency. Specifically, the current in the fuel cell is flowed through a second driven cell and measured. The fuel cell current oscillations are evaluated by the driven cell and fuel is admitted to the fuel cell in an inverse proportion to the current across the driven cell, thus keep the fuel cell operating within optimum limits.

---

This invention is directed to a method of determining the concentration of the solute in the solvent of a solution and in the device for making such determination. In particular, this invention is directed to a method and apparatus for determining the amount of an organic solute in a solution. More particularly, the invention is directed to a control apparatus and method for determining the amount of an anodically oxidizable organic compound in a solution. Most particularly, the invention relates to a method, a control apparatus and electrical circuitry for analyzing a solution to determine the amount of anodically oxidizable organic compounds such as methanol therein.

Many methods have been suggested heretofore for attempting to monitor the concentration of the solute in a solvent. However, these prior methods are cumbersome and are not sufficiently continuous so as to afford an accurate description of the concentration of the solute in the solvent. In particular, the concentration of the solute is most important in the operation of anodic oxidation processes such as in the manufacture of chemicals or in the operation of a fuel cell. The concentration in either of such processes, as the anodic oxidation of chemical compounds to produce oxygenated chemical compounds or to produce electricity, is dependent upon the concentration of the compound to be oxidized. It is well-known that in a fuel cell, operating with a liquid electrolyte wherein the fuel is dissolved, that if the concentration becomes quite small, the efficiency of the cell decreases due to the lack of fuel. However, if the concentration is excessive beyond certain limits, then the excess concentration causes a decrease in efficiency due to concentration polarization.

Many methods have been proposed to maintain the fuel concentration in a fuel cell within certain critical limits. However, none of these suggested methods has gained wide use due to their inaccuracy and the cumbersomeness of the apparatus required.

It has now been found that a relatively simple arrangement may be used to provide highly accurate control of the concentration of the fuel in a fuel cell or the reactants in an anodic oxidation process or to keep a running record of the solute in a solvent which is electrically conductive.

A device for the dual purpose of analyzing and controlling a system is based on the principle that the current carrying capability of a given anode is limited by the concentration of the compound to be oxidized in the electrolyte. All other variables being constant, it is possible to determine the concentration of the compound to be oxidized by simple DC voltage and current measurements. However, electrode condition is a difficult variable to maintain constant. Therefore, steady state measurements, that is, measurements which will maintain themselves over long periods of time, do not remain stable particularly with these small electrodes that, of necessity, must be used in an analyzer cell. Stable and reproducible measurements can be obtained under dynamic test conditions by programming the current through a driven cell and measuring the peak current in the system during some portion of a test cycle. The relationship between peak current and concentration of the solute is a constant for each solute. The scanning technique of this invention produces results which are stable to plus or minus 0.5% over a two-hour period.

The scanning technique of this invention uses a linear ramp function providing "on" cycle conditions over a period of a number of seconds. A similar period called the "off" period between each "on" cycle is included in the program of the analyzer. The "off" cycle is an important part of providing analyzer electrode stability. Various time cycles can be used depending upon the characteristics of the particular analyzer system. The preferred "on" and "off" periods are about 35 to 75 seconds, preferably about 50 seconds. Such characteristics would be the current levels, electrode size, concentration range desired or the particular solute being used. In particular, the "off" cycle must be long enough to allow system recovery to conditions which support current during the "on" cycle and are responsive to the solute concentrations in the electrolyte.

Basically, the control system of this invention includes a current scanning cycle which evaluates the performance of the analyzer cell based on reaching a limiting current causing high polarization voltage depending on the solute concentration in the cell. When high polarization occurs, the voltage detector turns on the fuel delivery device for the remainder of the "on" scanning cycle. The level of the current during the "on" scanning cycle is varied by the current demand on the complete power generator. Thus, the fuel concentration level is evaluated based on the current demand on the system and fuel is added in proportion to the reactant needed.

Referring now to the attached drawings which are for the purpose of clarity and are not to be deemed as limitations upon the scope of the invention as set forth in the claims, there is shown in FIGURE 1 a function of current in relationship to the volume of solute.

FIGURE 2 is a block diagram of the component parts of the analyzer controller of this invention.

Figure 3:
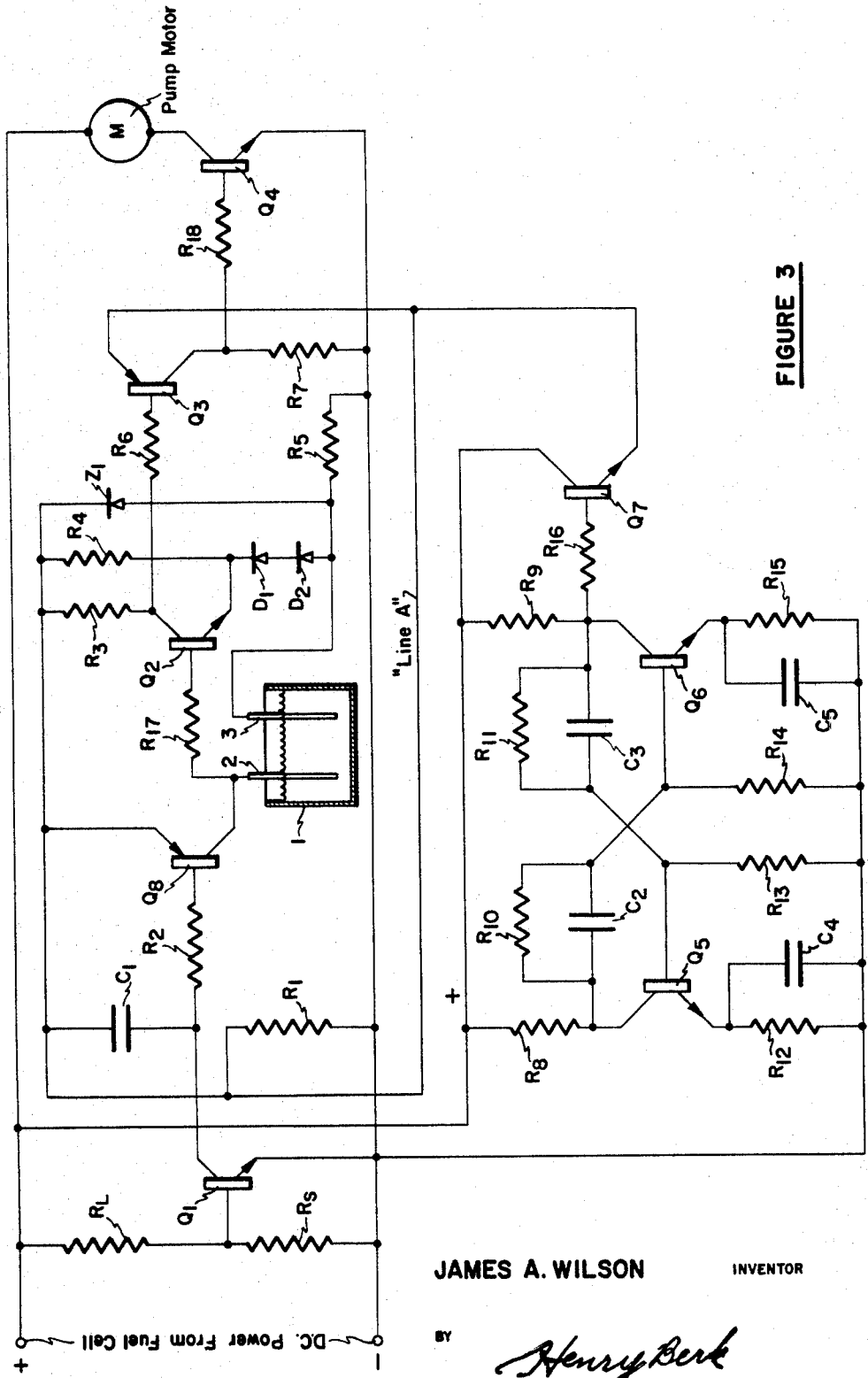
FIGURE 3 is a circuit diagram of the analyzer controller of this invention.

Referring now to FIGURE 1, there is shown the relationship between the current and the volume percent of the solute in the electrolyte. The function of current and solute will fall on some line as set forth in the drawing. Peak anodic currents above the line for any given concentration result in severe anode polarization. The Δ's mark different values at certain selected percents of solute. This characteristic solute requirement curve to support peak anodic currents can be programmed into the analyzer. When the current exceeds the value set forth on the line, severe cell polarization occurs and the pump is turned on, fuel is injected and the concentration of the fuel will increase. When the current falls below the line, only normal polarization occurs and the pumps will remain off.

Referring now to FIGURE 2, there is shown a current detector and amplifier 4 which feeds the current from the direct power source to the current scanning and other electrical components. The scanning generator 5 evaluates the performance of the analyzer cell 1. The cycle generator 8 controls the on-off periods of the cell. Base cycle generator 8 is connected to a DC power source (not shown) through terminals 10 and 11. The DC power may be the fuel cell itself, a battery or other convenient source. The comparator 6 compares the polarization voltage across the analyzer cell 1 with the normal reference level and depending upon whether the cell polarization exceeds or is equal to the normal level actuates or deactivates the pump motor 7. Pump motor 7 drives the pump 9. The analyzer cell 1 contains an electrolyte and the solute of the chemical reactor. There is shown in FIGURE 2 the analyzer cell 1 which is a container adapted to retain a liquid and anode 2 and cathode 3 which are both fine platinum wires.

Referring now to FIGURE 3, there is shown a circuit diagram of the components set forth in the block diagram of FIGURE 2. Current drain on a DC power source such as a fuel cell is the result of load $R_1$ and flows through current shunt $R_s$. The voltage drop across $R_s$ is in the millivolt range and is applied to the emitter-base circuit $Q_1$. This current flow in the emitter-base circuit causes a change in the current flow characteristics of the collector circuit of $Q_1$ which changes the rate of the charging of ramp capacitor $C_1$. This arrangement provides a means for charging capacitor $C_1$ at a rate proportional to the current through the load $R_1$. The base cycle generator set forth in FIGURE 2 is comprised of components $Q_5$, $Q_6$ and resistors $R_8$ through $R_{15}$ and capacitors $C_2$ through $C_5$. The base cycle generator of FIGURE 2 as set forth in the diagram of FIGURE 3 is a low frequency multivibrator running under repeat cycle conditions of about 30 seconds per half cycle. The multivibrator acts as a control for switching transistor $Q_7$. When transistor $Q_6$ in the multivibrator is nonconducting, there is no voltage drop across the resistor $R_9$ and thus no current flow through limiting resistor $R_{16}$ and the base-emitter circuit of transistor $Q_7$. During the multivibrator half cycle in which $Q_6$ is conducting, the voltage drop across resistor $R_9$ causes the current flow through limiting resistor $R_{16}$ and the emitter-base circuit of transistor $Q_7$. This causes transistor $Q_7$ to become very conductive through the emitter-collector circuit and substantially connects "Line A" to the positive side of the DC power line. The positive voltage through Line A provides power for the operation of all functions in the current scanning ramp generator of FIGURE 2 and voltage comparator and switch of FIGURE 2. The current scanning ramp generator of FIGURE 2 comprises the components capacitor $C_1$, resistors $R_1$ and $R_2$, transistor $Q_8$, resistor $R_5$ and Zener diode $Z_1$. These components comprise the current scanning ramp generator of FIGURE 2. During that portion of the cycle when Line A is connected to the positive side of the power line by the action of $Q_7$, the voltage across condenser $C_1$ is increased at a rate dependent on the collector current of amplifier $Q_1$. Voltage developed across $C_1$ causes a current to flow through sampling resistor $R_2$ and the base-emitter circuit of $Q_8$. This current increases the conductive characteristics of emitter-collector circuit $Q_8$ causing current to flow through the analysis cell 1 by a route through $R_5$. The cell 1 contains a platinum anode 2 and a platinum cathode 3 along with a sulfuric acid electrolyte and a solute. Electrons flow through the cell 1 by the oxidation of solute at the anode and the liberation of hydrogen at the cathode. The current conduction through the cell has an upper limit which is a function of the solute concentration. When the upper limit of current is exceeded, the voltage drop across the cell increases sharply from the level of about 0.7 to 0.85 volt when the solute is methanol to a voltage of greater than 1.0 volt. The upper limit is established by the zero level of $Z_1$ minus the drop across $Q_8$. The $C_1$ level may be chosen at some figure such as 2.0 volts and the typical drop across $Q_8$ is about 0.5 volt which sets the upper limit across the cell 1 at 1.5 volts. The voltage comparator and switch of FIGURE 2 comprise the components of $Q_2$, $Q_3$, $R_{17}$, $R_3$, $R_4$, $R_6$, $R_7$ and $D_1$ and $D_2$. The component parts of the comparator and switch comprise a voltage convertor and switch circuit. $D_1$ and $D_2$ are small diodes of preferably germanium so chosen to provide a voltage drop across the series connected terminals of about 0.95 to one volt. The value of limiting resistor $R_4$ controls the current through diodes $D_1$ and $D_2$ and can be used to adjust the proper voltage drop across the two diodes. The voltage level across the two diodes $D_1$ and $D_2$ establishes a bias level in the emitter-base circuit of $Q_2$ such that the voltage detector $Q_2$ causes no current to flow through resistor $R_3$ as long as the voltage drop across the cell 1 is less than the bias level. When the voltage drop across the cell exceeds the bias level of $Q_2$ established by the diodes $D_1$ and $D_2$, current flows through limiting resistor $R_{17}$ and the base-emitter circuit of $Q_2$. When the bias level is exceeded, there results a current flow through resistor $R_3$ and a voltage drop which causes current flow through limiting resistor $R_6$ and the emitter-base circuit $Q_3$. Current flow then occurs in the emitter-collector circuit of $Q_3$ through resistor $R_7$. The pump motor control and motor of FIGURE 2 are set forth in the diagram of this figure by component parts $R_{18}$, $Q_4$ and the pump motor. The current flow through $R_7$ causes a voltage drop which makes current flow through limiting resistor $R_{18}$ and the emitter-base circuit of $Q_4$. This results in current flow through the emitter-collector circuit of $Q_4$ and the DC motor driving the fuel pump. Assuming that the maximum current has occurred and the cell is polarized at some point in the middle of the analysis cycle, the pump will come to the "on" position and continue to deliver fuel to the system until the base cycle generator switches to the "off" part of its cycle. All functions stop due to the lack of conduction of $Q_7$ and no power being available through Line A during the "off" cycle, the ramp capacitor $C_1$ discharges to near zero level and the voltage across the cell terminals drops to zero.

Depending upon the rate of fuel injection and the response time of the fuel system on the next analysis cycle, the analyzer cell may either reach maximum current later in the cycle or fail to reach the limiting current. The analysis cycle is when $Q_7$ is conducting. The later in the cycle limiting current is reached, the less time the pump operates. This operation provides proportional control. Also, if the current demand on the main system increases, the rate of rise of the ramp is increased. This causes the analyzer cell to reach maximum limiting current earlier in the cycle and causes the pump to run longer.

The following example is proposed in order to more clearly set forth applicant's invention and is not deemed to be a limitation upon the scope of the invention as set forth in the appended claims.

Example

The analyzer controller of the instant invention was tested. The control device was assembled in accordance with the diagram set forth in FIGURE 3. The direct power source was a fuel cell operating with methanol as the fuel. The fuel cell provided the power for the operation of the controller analyzer. Part of the fuel-electrolyte mixture of the fuel cell was fed through and into the analyzer cell 1 of FIGURE 3. Thirty weight percent sulfuric acid was used as the electrolyte both in the fuel cell providing the power and in the analyzer cell. The temperature of the operation of both the cell and the analyzer cell was ambient temperature which was about 25° C. The electrodes 1 and 2 of the analyzer cell were platinum black on fine platinum wires. There is about 2 grams of platinum per square foot of electrode surface. The cell is operated and maintains the concentration of the fuel in the fuel cell between the concentration levels of 0.4 to 0.6. The control device of this invention operates efficiently for a prolonged period of time. The scanning cycle used includes on and off periods, each of about 50 seconds duration.

What is claimed is:
1. In a method of operating a fuel cell utilizing a liquid fuel, the improvement which comprises flowing part of the current from the cell through a second driven analyzer cell and measuring the peak current of the said driven analyzer cell, said current flow rising linearly with on and off periods of substantially the same time interval and automatically controlling the input of fuel inversely with the current through the driven analyzer cell responsive to the fuel concentration in the fuel cell.
2. A control for maintaining the fuel concentration in a fuel cell employing a liquid electrolyte and a fuel miscible therein which comprises in combination:
   (a) a current detector adapted to be connected through a current shunt to the positive and negative poles of a fuel cell electrically connected in series, with
   (b) a current scanning ramp generator means whereby the ramp rate is controlled by the main cell current,
   (c) a driven analyzer cell containing the fuel-electrolyte mixture of the fuel cell,
   (d) pump means,
   (e) a means for comparing the polarization across the analyzer cell with the normal reference level and means for actuating said pump means in response to said comparison, and
   (f) a base cycle generator means electrically connected in a series control circuit between the power source and said current detector and amplifier means and said current scanning ramp generator means and means for voltage comparison and means for pump control, said base cycle generator controlling the on-off periods of the control.
3. A method as in claim 1 wherein the fuel is 0.2 to 0.6 volume percent methanol and the peak current is between about 27 to 43 ma.
4. A method as in claim 1 wherein each of the on and off cycles is about 50 seconds in duration.

References Cited

UNITED STATES PATENTS

| | | | |
|---|---|---|---|
| 2,763,283 | 9/1956 | Griffith et al. | 103—25 |
| 2,782,151 | 2/1957 | Suthard | 204—1 X |
| 2,925,455 | 2/1960 | Eidensohn et al. | 136—86 |
| 3,107,184 | 10/1963 | Gilbert | 136—86 X |
| 3,284,240 | 11/1966 | Kring | 136—86 |

ALLEN B. CURTIS, *Primary Examiner.*